United States Patent
Panguluri et al.

(10) Patent No.: US 9,454,342 B2
(45) Date of Patent: Sep. 27, 2016

(54) GENERATING A PLAYLIST BASED ON A DATA GENERATION ATTRIBUTE

(71) Applicant: Tribune Digital Ventures, LLC, Chicago, IL (US)

(72) Inventors: Venkatarama Anilkumar Panguluri, Milipitas, CA (US); Venkata Sunil Kumar Yarram, Cupertino, CA (US); Raghavendra Sunku, Novato, CA (US)

(73) Assignee: Tribune Digital Ventures, LLC, Chicago, IL (US)

( * ) Notice: Subject to any disclaimer, the term of this patent is extended or adjusted under 35 U.S.C. 154(b) by 183 days.

(21) Appl. No.: 14/196,870

(22) Filed: Mar. 4, 2014

(65) Prior Publication Data

US 2015/0254050 A1    Sep. 10, 2015

(51) Int. Cl.
*G06F 17/00* (2006.01)
*G06F 3/16* (2006.01)

(52) U.S. Cl.
CPC ...................... *G06F 3/16* (2013.01)

(58) Field of Classification Search
CPC ................. G06F 17/30053; G06F 17/30749; G06F 17/30772; H04H 20/38
See application file for complete search history.

(56) References Cited

U.S. PATENT DOCUMENTS

| | | |
|---|---|---|
| 6,345,250 B1 | 2/2002 | Martin |
| 6,460,036 B1 | 10/2002 | Herz |
| 7,006,967 B1 | 2/2006 | Kahn et al. |
| 8,364,757 B2 | 1/2013 | Scott et al. |
| 2002/0002032 A1 | 1/2002 | Fleenor |
| 2002/0091524 A1 | 7/2002 | Guedalia et al. |
| 2003/0130894 A1 | 7/2003 | Huettner et al. |
| 2003/0158735 A1 | 8/2003 | Yamada et al. |
| 2005/0021500 A1 | 1/2005 | Plastina et al. |
| 2005/0033582 A1 | 2/2005 | Gadd et al. |
| 2005/0097613 A1 | 5/2005 | Ulate et al. |
| 2005/0125232 A1 | 6/2005 | Gadd |
| 2005/0174889 A1 | 8/2005 | Marcantonio et al. |
| 2005/0182675 A1 | 8/2005 | Huettner |
| 2006/0020609 A1 | 1/2006 | LaChapelle et al. |
| 2007/0036289 A1 | 2/2007 | Fu et al. |
| 2007/0198353 A1 | 8/2007 | Behringer et al. |
| 2007/0294222 A1 | 12/2007 | Laurila et al. |
| 2008/0028094 A1 | 1/2008 | Kang |

(Continued)

FOREIGN PATENT DOCUMENTS

| | | |
|---|---|---|
| KR | 1020100000249 A | 1/2010 |
| KR | 1020110117496 | 10/2011 |
| KR | 1020140014664 A | 2/2014 |

OTHER PUBLICATIONS

Printout of website relating to "Stitcher Radio for Podcasts" app, printed Mar. 4, 2014, 4 pages.

(Continued)

*Primary Examiner* — Joseph Saunders, Jr.
(74) *Attorney, Agent, or Firm* — McDonnell Boehnen Hulbert & Berghoff LLP

(57) ABSTRACT

An example method involves determining an attribute associated with an audible version of a news story, wherein the attribute indicates a manner in which data representing the audible version of the news story was generated; using the determined attribute associated with the audible version of the news story as a basis to generate a playlist of a news program that includes the audible version of the news story; and transmitting the generated playlist to a client device.

21 Claims, 6 Drawing Sheets

(56) References Cited

U.S. PATENT DOCUMENTS

| | | |
|---|---|---|
| 2008/0046948 A1 | 2/2008 | Verosub |
| 2008/0189099 A1 | 8/2008 | Friedman et al. |
| 2008/0190267 A1* | 8/2008 | Rechsteiner ......... G10H 1/0041 84/609 |
| 2008/0195664 A1 | 8/2008 | Maharajh et al. |
| 2008/0256129 A1 | 10/2008 | Salinas et al. |
| 2009/0063511 A1 | 3/2009 | Myers et al. |
| 2010/0004768 A1* | 1/2010 | Dunning ................. G06Q 30/02 700/94 |
| 2010/0082346 A1 | 4/2010 | Rogers et al. |
| 2010/0095333 A1 | 4/2010 | Kelly |
| 2010/0241963 A1 | 9/2010 | Kulis et al. |
| 2010/0251098 A1 | 9/2010 | Rekhi et al. |
| 2011/0066941 A1 | 3/2011 | Chipchase |
| 2011/0167390 A1 | 7/2011 | Reed, Jr. et al. |
| 2011/0320443 A1 | 12/2011 | Ray et al. |
| 2012/0057842 A1 | 3/2012 | Caligor et al. |
| 2012/0159336 A1 | 6/2012 | Norwood |
| 2012/0185070 A1 | 7/2012 | Hagg et al. |
| 2012/0203838 A1 | 8/2012 | Zuckerberg |
| 2012/0245982 A1 | 9/2012 | Daniel |
| 2013/0231931 A1 | 9/2013 | Kulis et al. |
| 2013/0304822 A1 | 11/2013 | Tetreault |

OTHER PUBLICATIONS

Printout of website relating to "Rivet News Radio" app, printed Mar. 4, 2014, 2 pages.
Printout of website relating to "Swell Radio for News and Podcasts" app, printed Mar. 4, 2014, 3 pages.
Printout of website relating to "Swell FAQs", printed Mar. 4, 2014, 6 pages.
International Search Report and Written Opinion dated Mar. 31, 2015, issued in connection with International Patent Application No. PCT/US2014/072812, filed on Dec. 30, 2014.
International Searching Authority, International Search Report and Written Opinion mailed on Mar. 25, 2015, issued in connection with International Patent Application No. PCT/US2014/072111, filed on Dec. 23, 2014, 12 pages.
International Searching Authority, International Search Report and Written Opinion mailed on Mar. 17, 2015, issued in connection with International Patent Application No. PCT/US2014/072829, filed on Dec. 30, 2014, 12 pages.
Harris, Melissa, "Pandora-like news radio app about to launch," Chicago Tribune website (http://articles.chicagotribune.com/2013-12-01/business/ct-biz-1201-confidential-levy-20131201_1_traffic-report-traffic-information-app), Dec. 1, 2013, 4 pages.
Non-Final Office Action mailed on Jun. 23, 2016, issued in connection with U.S. Appl. No. 14/196,774, filed Mar. 4, 2014, 18 pages.

* cited by examiner

GENERATING A PLAYLIST BASED ON A DATA GENERATION ATTRIBUTE

USAGE AND TERMINOLOGY

In this disclosure, unless otherwise specified and/or unless the particular context clearly dictates otherwise, each usage of "a" or "an" means at least one, and each usage of "the" means the at least one.

TECHNICAL FIELD

This disclosure relates generally to computing devices, and more particularly, to computing devices configured for providing media content such as personalized news programs for instance.

BACKGROUND

Unless otherwise indicated herein, the materials described in this section are not prior art to the claims in this disclosure and are not admitted to be prior art by inclusion in this section.

To listen to the radio, a listener typically tunes a receiver to a particular frequency (e.g., an AM or FM frequency) and listens to music, news, or other audible content being broadcast on that frequency by a radio station. The listener may tune the receiver, and therefore select a radio station, in a variety of ways, such as by rotating a dial, pushing a seek button, or pushing a station preset button. By selecting one of multiple radio stations, the listener may exert some control over the audible content presented to the listener. However, although the listener may control which station is selected, the listener is unlikely to have any influence over the audible content that gets broadcast by the selected station.

Typically, a radio station broadcasts the same audible content to multiple receivers, and therefore to multiple listeners, at the same time. Given this, it is common for a radio station to produce and broadcast audible content that is intended to appeal to a variety of different listeners. However, while some listeners may find such audible content appealing, other listeners may find it unappealing because it is not tailored to their particular interests.

SUMMARY

In one aspect, an example method involves determining an attribute associated with an audible version of a news story, wherein the attribute indicates a manner in which data representing the audible version of the news story was generated; using the determined attribute associated with the audible version of the news story as a basis to generate a playlist of a news program that includes the audible version of the news story; and transmitting the generated playlist to a client device.

In another aspect, an example non-transitory computer-readable medium has stored thereon instructions, that when executed by a processor, cause performance of a set of functions. The set of functions includes determining an attribute associated with an audible version of a news story, wherein the attribute indicates a manner in which data representing the audible version of the news story was generated; using the determined attribute associated with the audible version of the news story as a basis to generate a playlist of a news program that includes the audible version of the news story; and transmitting the generated playlist to a client device.

In yet another aspect, an example server device includes a communication interface, a processor, and a non-transitory computer-readable medium having stored thereon instructions, that when executed by the processor, cause the server device to perform a set of functions. The set of functions includes determining an attribute associated with an audible version of a news story, wherein the attribute indicates a manner in which data representing the audible version of the news story was generated; using the determined attribute associated with the audible version of the news story as a basis to generate a playlist of a news program that includes the audible version of the news story; and transmitting the generated playlist to a client device via the communication interface.

In still another aspect, an example method involves determining an attribute associated with an audible version of a news story, wherein the attribute indicates a manner in which data representing the audible version of the news story was generated; using the determined attribute associated with the audible version of the news story as a basis to generate a playlist of a news program that includes the audible version of the news story; and traversing the generated playlist, and for each media content item referenced by the playlist, (i) retrieving data representing the media content item, and (ii) using the retrieved data to play out the media.

These, as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
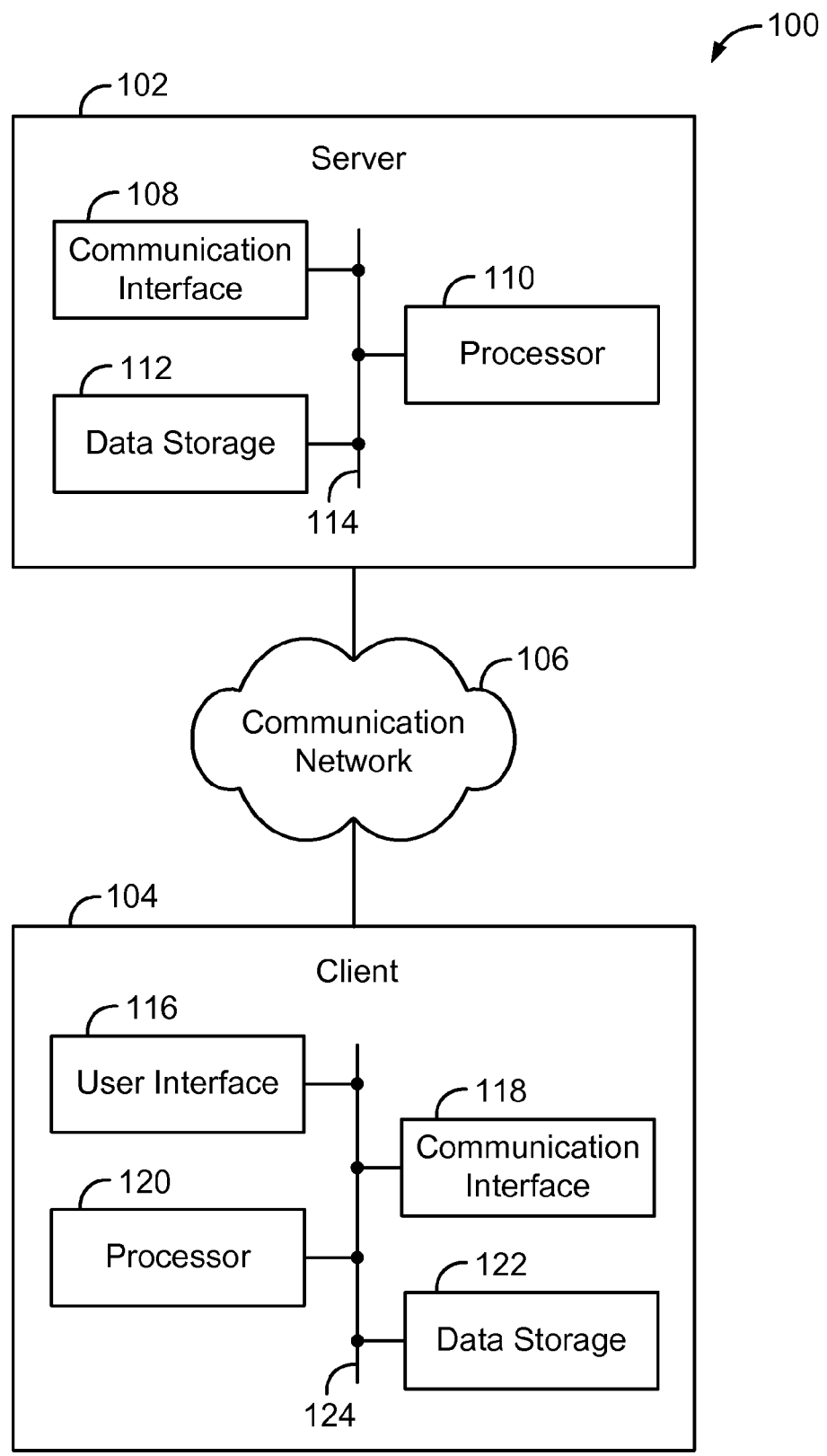
FIG. 1 is a simplified block diagram of an example system.

As indicated above, a radio station may produce and broadcast audible content that is intended to appeal to a variety of different listeners. For example, in the context of producing and broadcasting a news program, a narrator (such as a news anchor affiliated with the radio station, or another person) may read aloud news stories from each of a variety of different predetermined categories, such as sports, politics, and entertainment, and the readings may be included as part of the news program.

Although some listeners may be interested in audible versions of news stories from all of the predetermined categories, other listeners may have different interests. For example, one listener may be interested in sports and entertainment, but not politics, while another listener may be interested in politics and entertainment, but not sports. In either case, the listener may be presented with audible content that does not align with the listener's interests. As a result, the listener may find the news program unappealing.

One way to help address this issue is by implementing a system that provides a user with a personalized news program. In one aspect, such a system may include at least two computing devices, such as a server and a client, and a communication network through which the server and the client may communicate.

In this system, the server and the client may perform a variety of functions. For example, the server may determine a set of attributes associated with a user of the client and may use the determined set of attributes as a basis to generate a playlist of a personalized news program for the user. The generated playlist may define a sequence of media content items, each of which may include audible content such as an audible version of a news story. An audible version of a news story may be referred to herein as an "audible news story." The generated playlist may also specify media content attribute data respectively for each media content item, including for instance a reference to data representing the media content item and metadata characterizing the media content item. Collectively, this sequence of media content items may thus define a personalized news program for playout to the user.

After or as the server generates this playlist, the server may transmit the playlist to the client, and the client may traverse the entries of the playlist, retrieve data representing each referenced media content item, and use the data to play out each referenced media content item in accordance with the sequence defined by the playlist. In practice, for instance, for each media content item of the sequence, (i) the client may transmit to the server, or to another server for that matter, a request for data representing the media content item, (ii) the server may receive the transmitted request, (iii) responsive to the server receiving the transmitted request, the server may transmit to the client, the requested data, (iv) the client may receive the transmitted data, and (v) the client may play out for the user the media content item represented by the received data.

Optimally, this process may involve streaming of the data representing the media content items to the client and playout of the sequence of media content items in real time by the client. In particular, for each media content item referenced by the playlist, the client may request a server to stream the data representing the media content item to the client, and the client may then receive in response a data stream defining the requested media content item. As the client receives and buffers the requested data representing the media content items in sequence, the client may then play out the represented media content items to a user, thus providing the user with a substantially continuous playout of the media content items defining the personalized news program.

In accordance with the present disclosure, another way to help render a news program, or for that matter, any sequence of media content items, more appealing to a user is for the server to determine an attribute associated with an audible version of a news story, namely an attribute that indicates a manner in which data representing the audible version of the news story was generated, and for the server to use the determined attribute as a basis to generate a playlist for the news program. This attribute may be referred to herein as a "data generation attribute."

As noted above, a media content item, and therefore an audible version of a news story may be represented by data. Data representing an audible version of a given news story may be generated in a variety of ways. For instance, the data may be generated by recording a human's verbal reading of a text-based version of the news story. Data generated in this manner may be referred to herein as "recorded voice data." Alternatively, the data may be generated via a text-to-speech (TTS) system based on data representing the text-based version of the news story. Data generated in this manner may be referred to herein as "TTS data." Upon a server receiving a request from a client for data representing an audible version of a news story, the server can fulfill the request by sending the available representative data (e.g., recorded voice data or TTS data) to the client.

To acquire recorded voice data for a given news story, the server may transmit a request to a remote recording station. A narrator at the remote recording station can then read aloud a text-based version of the news story into a microphone, at which point the recorded voice data can be recorded and transmitted to the server. Upon receipt at the server, the server can store the recorded voice data and can use the recorded voice data to fulfill a request for data representing an audible version of the news story.

To acquire TTS data for a given news story, the server may receive and provide data representing a text-based version of the news story to a TTS system. The TTS system may then analyze the provided text and create and output the corresponding TTS data. In one example, the TTS system may incorporate a variety of software-implemented and/or hardware-implemented logic instructions in combination with synthesizers and/or function generators that function to create the TTS data. The server may then store the TTS data and use the TTS data to fulfill a request for data representing an audible version of the news story.

In practice, for a given news story, a listener may prefer listening to an audible version of the news story represented by recorded voice data than an audible version of the news story represented by TTS data. Among other factors, a listener may find that the tone, cadence, and/or speech patterns represented by recorded voice data are more pleasant than those represented by TTS data.

Given this, in connection with generating a playlist of a news program for a user, a server may generally favor selecting an audible news story represented by recorded voice data over an audible news story represented by TTS data. Of course, in selecting an audible news story, the server may also consider other factors, such as another attribute associated with the audible news story and/or an attribute associated with the user (e.g., such that the news program may be personalized for the user). Accordingly, in one example, the server may use a data generation attribute of an audible news story as a factor among others in determining whether or not to select that audible news story in connection with generating a playlist.

Since the process of generating recorded voice data requires human interaction (since the user has to read text aloud), in some instances it may not be possible or practical to generate recorded voice data for a news story (e.g., for a news story that is relatively unpopular). In such instances, TTS data may instead be generated for that news story. And since some selectable audible news stories may be represented by recorded voice data and other selectable stored news stories may be represented by TTS data, in some instances, the server may generate a playlist for a news program that includes a mix of both types of audible news stories.

In addition to using a data generation attribute as a basis to select audible news stories in connection with generating a playlist, a server may also use the data generation attribute as a basis to arrange audible news stories within the playlist.

For example, the server may arrange a selected set of audible news stories such that the audible news stories in the set that are represented by recorded voice data are interspersed among the audible news stories in the set that are represented by TTS data. This may help avoid the case where too many consecutive audible news stories represented by TTS data are presented to a listener, which a listener may find unappealing.

After or as the server generates this playlist, the server may transmit the playlist to the client such that the client may playout each referenced audible news story as described above. As a result, the user may presented with a news program that may be appealing to a listener.

II. Example System

FIG. 1 is a simplified block diagram of an example system 100 in which aspects of the present disclosure can be implemented. As shown, the system 100 includes at least two computing devices, namely a server 102 and a client 104, and a communication network 106. Generally, the server 102 and the client 104 are configured for communicating with each other via the communication network 106.

A. Server

The server 102 may be configured for performing a variety of functions, such as those described in this disclosure (including the accompanying drawings). For example, the server 102 may be configured for establishing and transmitting to the client 104 a playlist defining a sequence of media content items that may define a personalized news program for instance, and for streaming data representing various media content items to the client 104 via the communication network 106 such that the client 104 may playout the represented media content items.

The server 102 may take a variety of forms and may include various components, including for example, a communication interface 108, a processor 110, and a data storage 112, all of which may be communicatively linked to each other via a system bus, network, or other connection mechanism 114.

The communication interface 108 may take a variety of forms and may be configured to allow the server 102 to communicate with one or more devices according to any number of protocols. For instance, the communication interface 108 may be configured to allow the server 102 to communicate with the client 104 via the communication network 106. In one example, the communication interface 108 may take the form of a wired interface, such as an Ethernet interface. As another example, the communication interface 108 may take the form of a wireless interface, such as a cellular or WI-FI interface.

The processor 110 may include a general purpose processor (e.g., a microprocessor) and/or a special purpose processor (e.g., a digital signal processors (DSP)).

The data storage 112 may include one or more volatile, non-volatile, removable, and/or non-removable storage components, such as magnetic, optical, or flash storage, and may be integrated in whole or in part with the processor 110. Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions, such as those described in this disclosure.

B. Client

Likewise, the client 104 may be configured for performing a variety of functions such as those described in this disclosure. For example, the client 104 may be configured for receiving from the server 102 a playlist defining a sequence of media content items to be played out by the client, traversing the entries of the playlist, retrieving the data representing each referenced media content item, and using the retrieved data to play out each referenced media content item in accordance with the sequence defined by the playlist The client 104 may take a variety of forms, including for example, a mobile phone, tablet, laptop, media player, gaming device, wearable device, or vehicle. And the client 104 may include various components, including for example, a user interface 116, a communication interface 118, a processor 120, and a data storage 122, all of which may be communicatively linked with each other via a system bus, network, or other connection mechanism 124.

The user interface 116 may be configured for facilitating interaction between the client 104 and a user of the client 104, such as by receiving input from the user and providing output to the user. Thus, the user interface 116 may include input components such as a computer mouse, a keyboard, a touch-sensitive panel, or perhaps a microphone for receiving voice commands. In addition, the user interface 116 may include output components such as a display screen (which, for example, may be combined with a touch-sensitive panel) a sound speaker or other audio output mechanism, and a haptic feedback system. Furthermore, the user interface 116 may include a digital-analog conversion unit to facilitate playout of media content to a user. Moreover, the client 102 may provide output to the user via another user interface system (e.g., the client 102 may communicate with an audio output system via a short range wireless communication, such as a connection established in accordance with IEEE 802.15).

The communication interface 118 may take a variety of forms and may be configured to allow the client 104 to communicate with one or more devices according to any number of protocols. For instance, the communication interface 118 may be configured to allow the client 104 to communicate with the server 102 via the communication network 106. Further, the communication interface 118 may take the form of a wired or wireless interface.

The processor 120 may include a general purpose processor and/or a special purpose processor. The data storage 122 may include one or more volatile, non-volatile, removable, and/or non-removable storage components, and may be integrated in whole or in part with the processor 120. Further, the data storage 122 may take the form of a non-transitory computer-readable storage medium, having stored thereon program instructions that, when executed by the processor 120, cause the client 104 to perform one or more functions, such as those described in this disclosure. Such program instructions may define or be part of a discrete software application, such as a native app or web app, that can be executed upon user request for instance.

C. Communication Network

Generally, the communication network 106 may be configured to allow the server 102 and the client 104 to communicate with each other using any number of protocols. In addition, the communication network 106 may take a variety of forms, including for example a packet-switched network such as the Internet.

III. Example Operations

Methods of this disclosure will now be described principally in connection with providing a personalized news program to a user of the client 104. It will be understood, however, that this disclosure can extend to apply with respect to providing other types of media content as well, not necessarily limited to personalized news programs.

Figure 2:
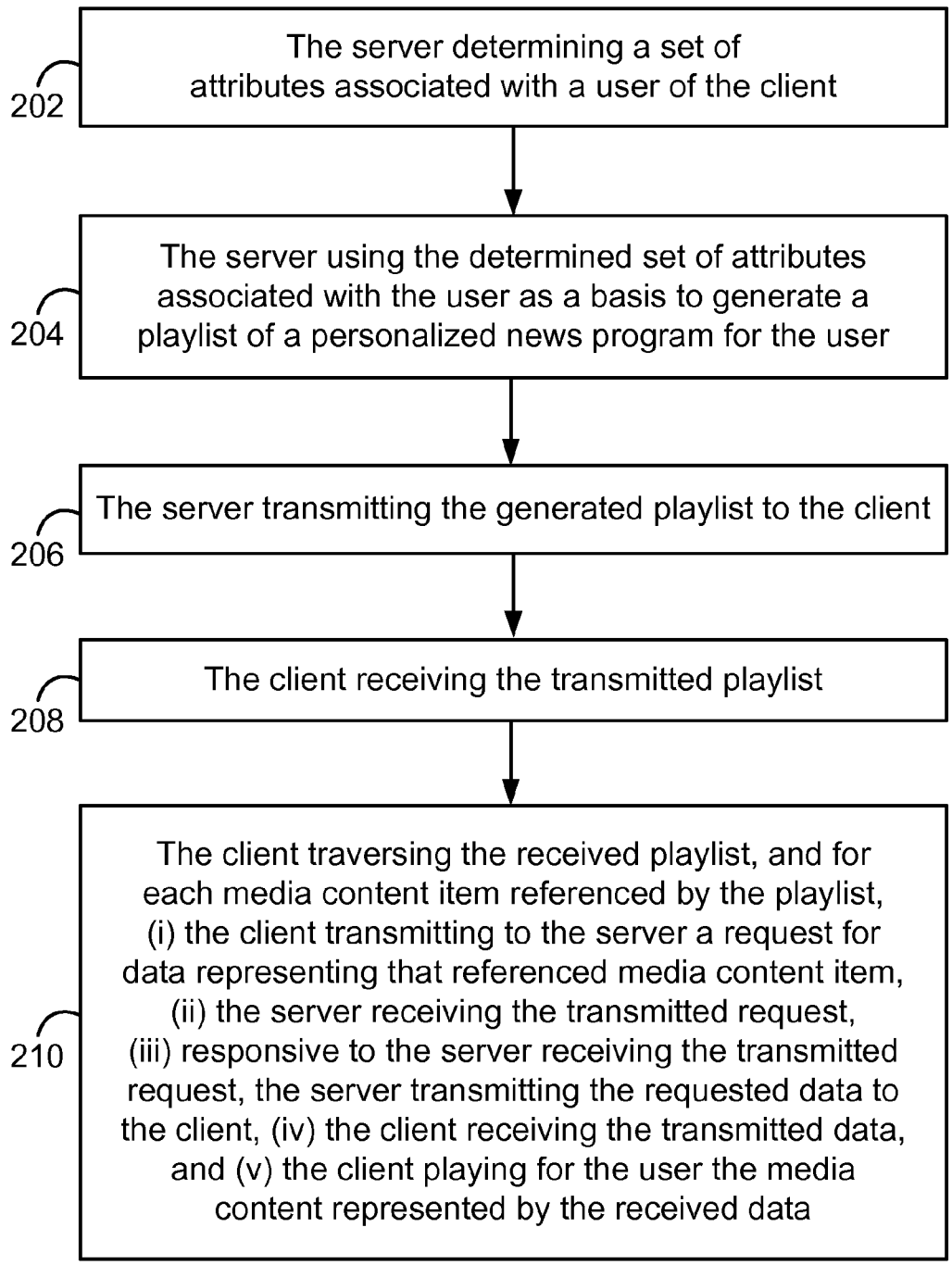
FIG. 2 is a flow chart depicting functions of an example method.

FIG. 2 is a flow chart depicting functions that can be carried out in an example method for providing a user of the client 104 with a personalized news program. At block 202, the example method involves the server 102 determining a set of (i.e., one or more) attributes associated with a user of the client 104. At block 204, the method then involves the server 102 using the determined set of attributes as a basis to generate a playlist of a personalized news program for the user. At block 206, the method then involves the server 102 transmitting the generated playlist to the client 104, and at block 208, the method involves the client 104 receiving the transmitted playlist. At block 210, the method then involves the client 104 traversing the received playlist, and for each media content item referenced by the playlist, (i) the client transmitting to the server a request for data representing that referenced media content item, (ii) the server receiving the transmitted request, (iii) responsive to the server receiving the transmitted request, the server transmitting the requested data to the client, (iv) the client receiving the transmitted data, and (v) the client playing for the user the media content item represented by the received data.

In this process, each user-associated attribute that the server 102 determines may take various forms. By way of example, each attribute may relate to one or more of the following: the user's extent of interest in a particular type of news story, the user's interest in a particular type of audible news story, whether the user has a subscription to a news-related product or service (e.g., a newspaper subscription), the user's age, the user's gender, the user's current location, the user's destined location (e.g., a location to which the user is driving), the weather at the user's current location, the weather at the user's destined location, and the user's estimated travel time between the user's current location and the user's destined location.

Further, the function of the server 102 determining the set of attributes associated with the user may take various forms. In one example implementation, for instance, the server 102 may receive from the client 104 an identification of the user of the client 104, and the server 102 may then refer to one or more data sources that correlate or facilitate correlation of that identification with an attribute, so as to determine an attribute associated with the user. And in another example implementation, the client 104 itself may determine a user-associated attribute and may report the determined attribute to the server 102, in which case the server would determine the user-associated attribute by receiving the reported attribute from the client 104. To facilitate this, the client 104 may provide a configuration interface through which the user can manually enter or select a user-associated attribute, and the client 104 may thus determine the user-associated attribute by receiving user indications of the user-associated attribute through that interface. Alternatively or additionally, the client 104 may determine a user-associated attribute by evaluating information associated with the user, such as user profile records, browsing history, shopping history, location history and the like. Other examples are possible as well.

For this purpose, the client 104 may determine the attribute associated with the user in a variety of ways. As one example, the client 104 may receive the attribute as input from the user. As another example, the client 104 may receive other input from the user, and the client 104 may use the input as a basis to determine the attribute. For instance, the client 104 may receive input from the user, such as the user's destined location, and the client 104 may use a positioning device and a navigation software application to determine the user's estimated travel time from the user's current location to the user's destined location. In some instances, the client may communicate with the server 102 or another server, such as a server affiliated with the mapping application, to determine such an attribute. Other example techniques for determining an attribute associated with a user are possible as well.

The server 102 may then use the determined set of attributes associated with the user in various ways to generate the playlist of the personalized news program for the user. For instance, based on the set of user-associated attributes, the server 102 may select particular audible news stories or types of audible news stories to specify as media content items in the playlist. As such, the server 102 may be configured with data that maps particular sets of user-associated attributes with particular types of audible news stories, possibly giving more weight to inclusion of certain types of audible news stories than to other types of audible news stories. For example, the data may indicate that a particular set of user-associated attributes suggests more likely user interest in entertainment news than in politics news, in which case the server 102 may structure the playlist to specify a greater extent of entertainment-related audible news stories than politics-related audible news stories. As another example, the data may indicate that a particular set of user-associated attributes suggests great user interest in sports, in which case the server 102 may structure the playlist to specify a relatively great extent of sports-related audible news stories.

In some examples, an audible news story's type may be defined by a set of attributes associated with the audible news story, examples of which may include or relate to one or more of the following: the audible news story's category, the audible news story's target demographic (e.g., by age, gender, or location), the audible news story's creation date, the audible news story's author or other attribution information, the extent of popularity of the audible news story, the extent of popularity of a person or topic related to the audible news story, or the manner in which data representing the audible news story was generated.

These attributes may be stored in a variety of ways. For example, they may be stored as metadata along with the data representing the audible news story to which they correspond. These attributes may also be set in a variety of different ways, such as by a user via a user interface.

As indicated above, a media content item such as an audible news story may be represented by data. This data may be generated in a variety of ways. For example, the server 102 may generate data representing an audible news story by recording a narrator reading aloud a text-based version of the news story, or by using a well-known TTS software and/or hardware system to convert data representing a text-based version of a news story into data representing an audible version of the news story. Further, data representing a media content item may be stored in a variety of ways. For example, the data may be stored in the form of a digital audio file in a data storage, such as the data storage 112.

In one implementation, the function of the server 102 using the determined set of attributes associated with the user as a basis to generate a playlist of a personalized news program for the user may involve the server 102 (i) using the determined set of attributes associated with the user as a basis to select a playlist template from a group of templates (e.g., stored in the data storage 112), (ii) using the selected playlist template as a basis to select a set of audible news stories from a group of audible news stories (e.g., stored in the data storage 112), and (iii) generating a playlist that includes references to each audible news story from the selected set of audible news stories.

Generally, a playlist template serves as an outline for a playlist and may define a sequence of placeholders for media content attribute data and/or media content attribute data itself. For each placeholder, the playlist template may further specify placeholder attribute data. Based on this placeholder attribute data, the server 102 may select a set of audible news stories, and replace that placeholder with media content attribute data for the selected set of audible news stories, thereby converting the playlist template into a playlist.

There may be a variety of different types of placeholder attribute data, examples of which may include a quantity tag and a type tag. A quantity tag specifies a quantity of audible news stories that the server 102 should select for the corresponding placeholder. And the type tag specifies the particular types of audible news stories that the server 102 should select for the corresponding placeholder.

As indicated above, a playlist template may define a sequence of placeholders for media content attribute data and/or media content attribute data itself. In the case where the sequence defines media content attribute data, the server 102 may forgo selecting a set of audible news stories for that entry as the server 102 generates the playlist and instead use the media content attribute data provided in the playlist template.

In line with the discussion above, the playlist that the server 102 generates may define an ordered sequence of entries, each of which provides media content attribute data regarding a respective media content item, such as a particular audible news story. In practice, the playlist may provide this information in various ways, such as with use of extensible markup language (XML) for instance, in a manner that the client 104 would be configured to read.

For a given media content item, the media content attribute data may include a reference to the data representing the media content item, such as a network address or content identifier that the client 104 can read and use as a basis to request and receive the data representing the media content item for playout of the represented media content item. Thus, the client 104 may read the reference indicated for a given media content item to determine a network address or the like from which to obtain the data representing the media content item, and the client 104 may request and receive the data representing the media content item from that network address or by otherwise using the indicated reference.

Such a reference may have various levels of granularity. By way of example, the reference may be specific to data representing a particular audible news story, by specifying a particular story identifier or name of a news story media file for instance, in which case the client 104 could request the server 102 to transmit that data representing that particular audible news story and the server 102 could retrieve that data representing that particular audible news story from data storage and transmit it to the client 104. And as another example, the reference may be more general, specifying a class of news story, such as "traffic" or "weather" for instance, in which case the client 104 could request the server 102 to transmit data representing an audible news story of that class generally, and the server 102 may then retrieve data representing a latest or most pertinent audible news story of that class and transmit it to the client 104. Further, any or all of these references may refer to locations other than server 102, such as to one or more other servers for instance.

Further, the server 102 may transmit the generated playlist to the client 104, and the client 104 may receive the generated playlist, in various ways. By way of example, the client 104 may transmit to the server 102 a hypertext transfer protocol (HTTP) request or the like seeking the playlist, and the server 102 may respond by generating the playlist and transmitting the playlist to the client 104 in an HTTP response or the like.

Continuing with reference to FIG. 2, as noted above, at block 210, the method involves the client 104 traversing the received playlist, and for each media content item of the sequence, (i) the client transmitting to the server, a request for data representing the media content item, (ii) the server receiving the transmitted request, (iii) responsive to the server receiving the transmitted request, the server transmitting to the client, the requested data, (iv) the client receiving the transmitted data, and (v) the client playing out for the user the media content item represented by the received data.

As further noted above, this process may involve streaming of the data representing the media content item from the server 102, or from one or more other servers, to the client 104. In practice, for instance, as the client 104 traverses the playlist, the client 104 may read each successive entry to determine the reference that the entry specifies for a media content item, and the client may transmit to the server 102 a request for the server 102 to stream the data representing that media content item to the client 104. To facilitate this, the client 104 may engage in signaling with the server 102 in accordance with the Real Time Streaming Protocol (RTSP), to establish a streaming media session and to specify the data representing the media content to be streamed, and the server 102 may stream the requested data to the client 104 in accordance with the Real-time Transport Protocol (RTP). As the client 104 receives this streamed data, the client 104 may then buffer and play out the content represented by the data in real time, providing the user with substantially continuous playout of the news program.

Figure 3:
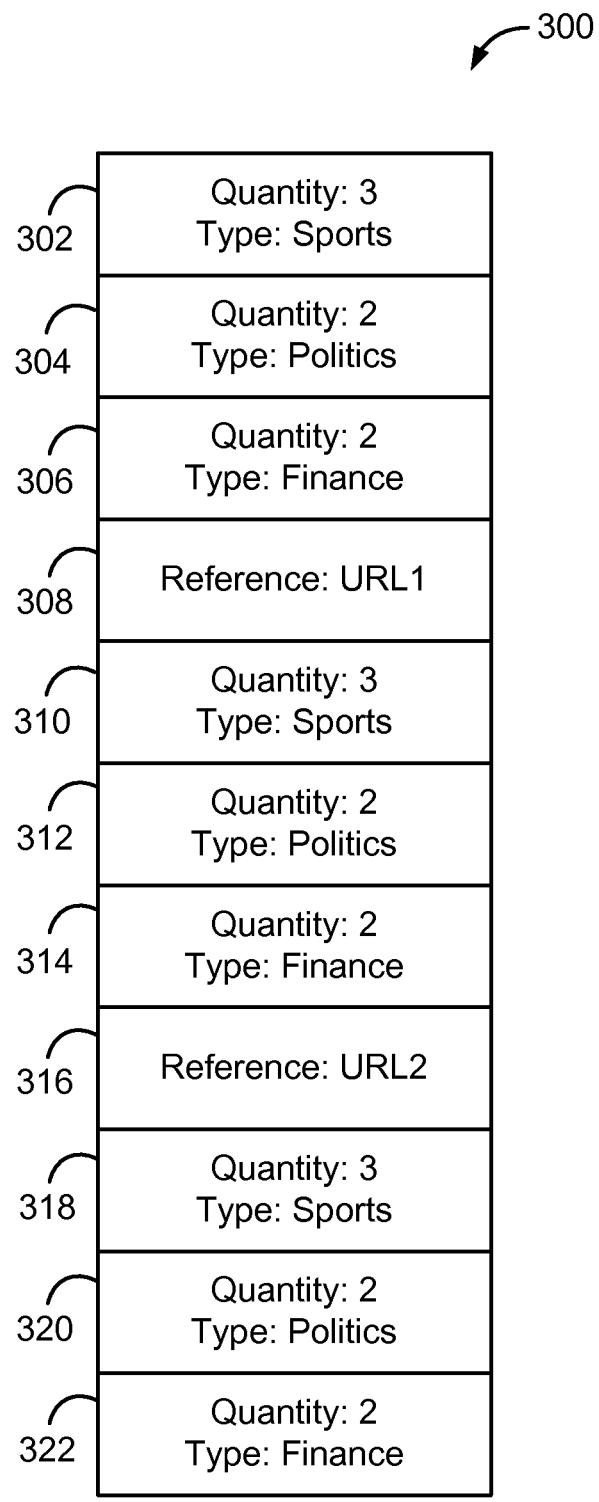
FIG. 3 is a diagram of an example playlist template.

To help appreciate operation of this process, FIG. 3 shows an example playlist template 300. The template 300 includes eleven ordered entries 302-322 (even numbers only). Each of the entries 302, 304, 306, 310, 312, 314, 318, 320, and 322 serves as a placeholder for media content attribute data. And each of those entries includes placeholder attribute data, namely a quantity tag and a type tag. For example, the entry 302 includes a quantity tag that specifies "3" and a type tag that specifies a "Sports" category type. As another example, the entry 304 includes a quantity tag that specifies "2" and a type tag that specifies a "Politics" category type. Further, each of the entries 308 and 316 include media content attribute data. In particular, the entry 308 includes the reference "URL1" and the entry 316 includes the reference "URL2."

As indicated above, at block 204, the method may involve the server 102 using the selected playlist template as a basis to select a set of audible news stories from a group of audible news stories (e.g., stored in the data storage 112). This may involve, for each entry that serves as a placeholder of media content attribute data, the server 102 using the quantity and type tags of that entry as a basis to select a set of audible news stories. For example, for the entry 302, the server 102 may select a set of 3 audible news stories that are all associated with a sports category attribute. As another example, for the entry 304, the server 102 may select a set of 2 audible news stories that are all associated with a politics category attribute.

Additionally or alternatively, the server 102 may determine an attribute associated with an audible news story, and the server 102 may use the determined attribute as a basis to select the set of audible news stories from the group of audible news stories.

As noted above, block 204 may involve generating a playlist that includes references to each audible news story from the selected set of audible news stories. This may involve the server 102 replacing placeholders of the playlist template with the appropriate selected sets of audible news stories, and thereby generating a playlist by "converting" the playlist template into a playlist.

Figure 4:
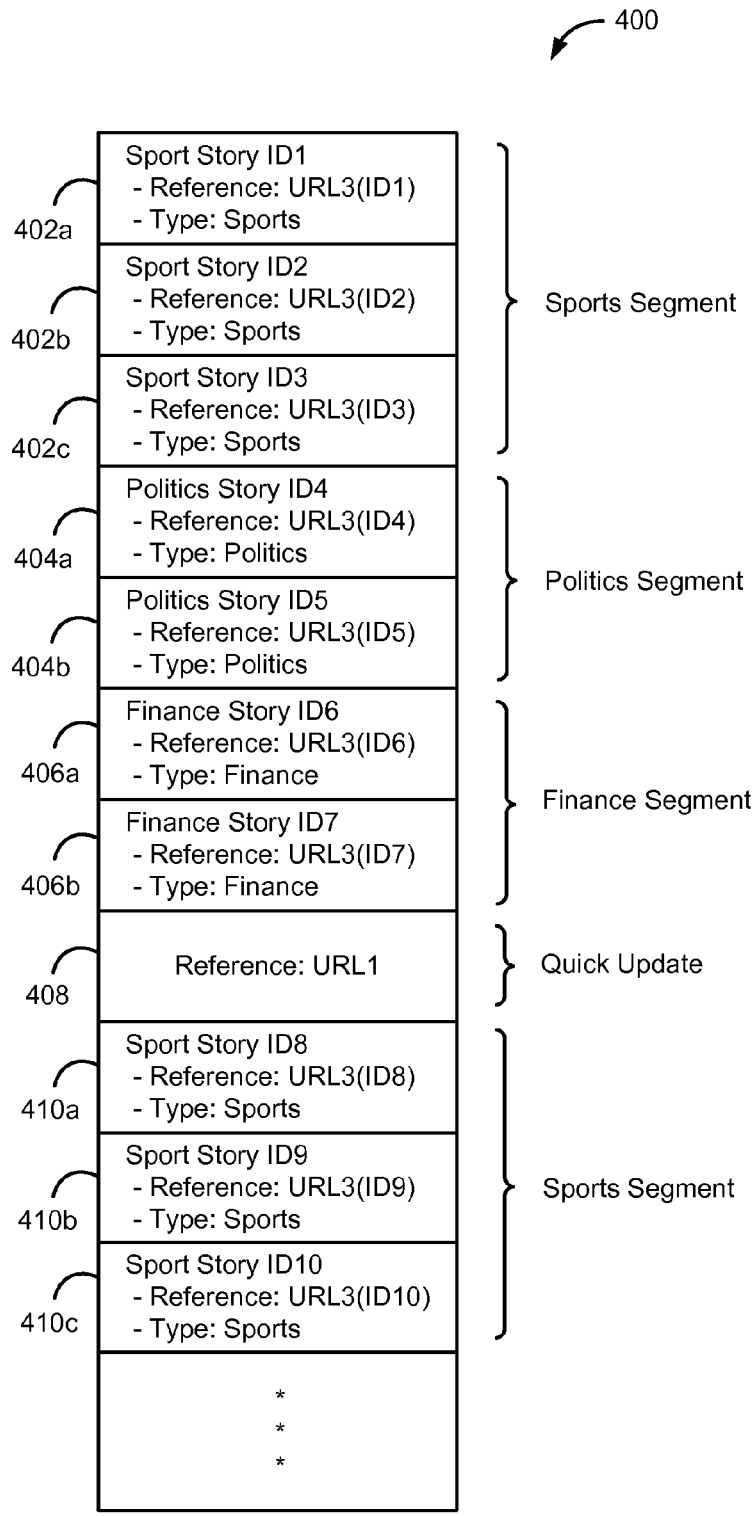
FIG. 4 is a diagram of an example playlist.

FIG. 4 shows a portion of an example playlist 400 that the server 102 may generate after the server 102 selects the playlist template 300. As shown, the generated playlist 400 include entries 402a-c, 404a-b, 406a-b, and 410a-c, each of which is for a respective audible news story and designates a respective reference and category type. For example, entry 402a designates a "Sports Story ID1," with a reference in the form of "URL3" that may point to the server 102 and that designates "ID1" as a query parameter or the like, and with a category type indication of "Sports." Entry 402b then designates a "Sports Story ID2," with a reference in the form of "URL3" that may point to the server 102 and that designates "ID2" as a query parameter, and with a category type indication of "Sports." And entry 402c designates a "Sports Story ID3," with a reference in the form of "URL3" that may point to the server 102 and that designates "ID3" as a query parameter, and with a category type indication of "Sports." As shown, this portion of the playlist 400 may be referred to as the "Sports Segment."

As another example, entry 404a designates a "Politics Story ID4," with a reference in the form of "URL3" that may point to the server 102 and that designates "ID4" as a query parameter, and with a category type indication of "Politics." And entry 404b designates a "Politics Story ID5," with a reference in the form of "URL3" that may point to the server 102 and that designates "ID5" as a query parameter, and with a category type indication of "Politics." As shown, this portion of the playlist 400 may be referred to as the "Politics Segment."

Since the entry 308 of the playlist template 300 included media content attribute data, namely the reference URL1, the server 102 may "carry though" the media content attribute data from the playlist template 300 to the playlist 400 as the server 102 generates the playlist 400. Accordingly, the entry 408 indicates the reference "URL3." As shown, this portion of the personalized news program may be referred to as a "quick update." In one example, a quick update may provide relatively small portions of data-centric information (e.g., traffic or weather information) to break up two segments in the personalized news program.

For brevity, FIG. 4 does not show additional entries after 410c, but it should be apparent that the server 102 may generate the remainder of the playlist 400 using the techniques described above.

As noted above, the server 102 may determine an attribute associated with an audible news story, and the server 102 may use the determined attribute as a basis to select the set of audible news stories from the group of audible news stories. An example of such an attribute is a data generation attribute, which as noted above, is an attribute that indicates a manner in which data representing the audible news story was generated.

Figure 5:
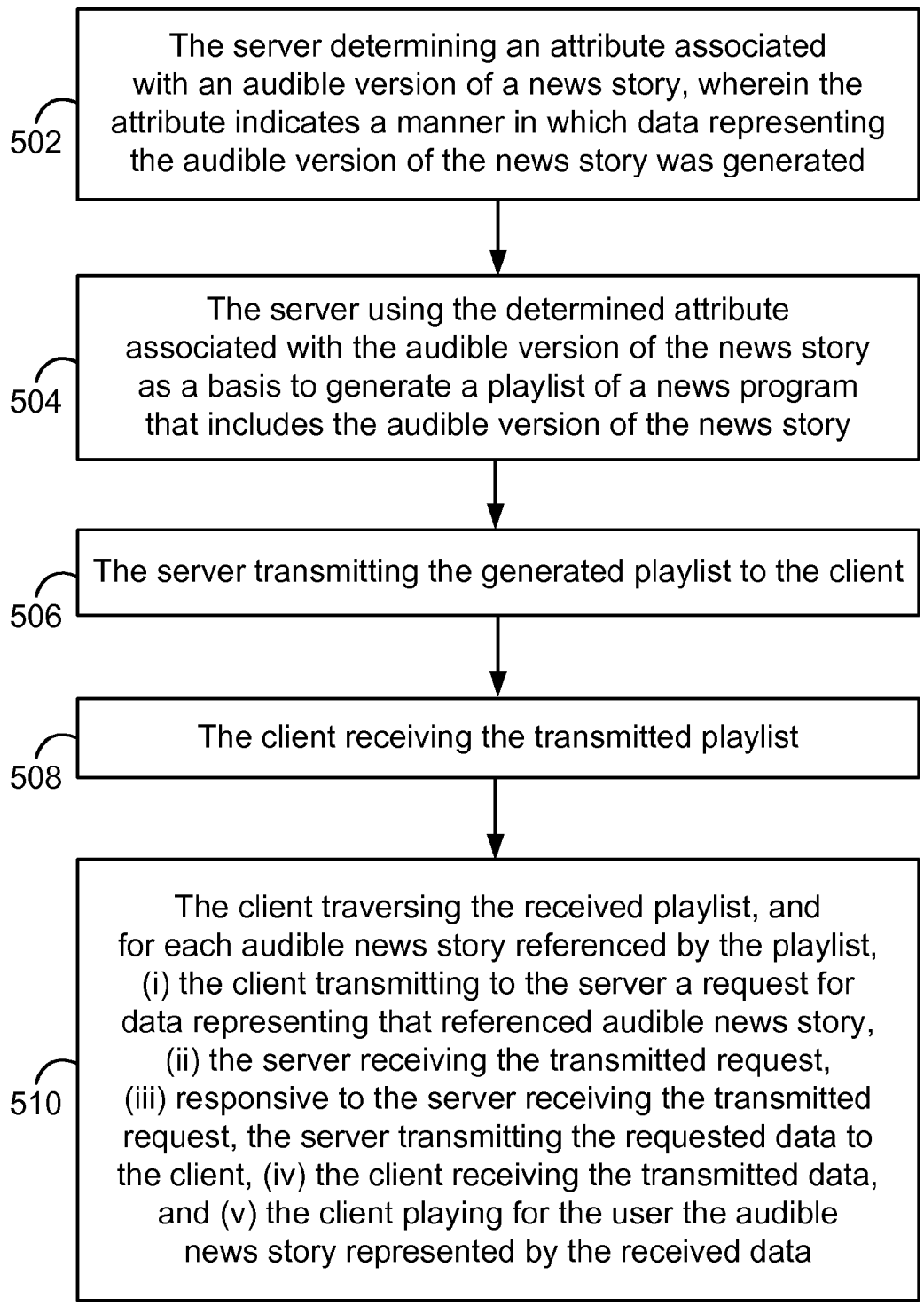
FIG. 5 is a flow chart depicting functions of another example method.

FIG. 5 is a flow chart depicting functions that can be carried out in another example method for providing a user of the client 104 with a news program. At block 502, the example method involves the server 102 determining an attribute associated with an audible version of a news story, wherein the attribute indicates a manner in which data representing the audible version of the news story was generated. As described above, this attribute may indicate that the data representing the audible version of the news story is recorded voice data or TTS data, for instance.

At block 504, the method then involves the server 102 using the determined attribute associated with the audible version of the news story as a basis to generate a playlist of a news program that includes the audible version of the news story. In one example, this may involve the server 102 (i) using the determined attribute associated with the audible version of the news story as a basis to select a set of audible news stories from a group of audible news stories, wherein the selected set of audible news stories includes the audible version of the news story; and (ii) using the selected set of audible news stories to generate the playlist, wherein the generated playlist includes references to each audible news story from the selected set of audible news stories.

In some instances, the server 102 may consider the determined attribute associated with the audible version of the news story, among other factors, in selecting the set of audible news stories. Such other factors may include, for instance, another attribute associated with the audible news story or an attribute associated with the user as described above in connection with FIG. 2. In some instances, these factors may be associated with a quantifiable value and a weighing index such that the server 102 may determine an overall quantifiable value for each audible news story in the group of audible news stories. Then, the server 102 may use the determined overall quantifiable values to select a set of audible news stories. For example, if the playlist calls for six audible news stories, the server 102 may select the six news stories with the highest determined total quantifiable values.

In some instances, the server 102 generating the playlist may involve the server 102 selecting a playlist template and using the playlist template (in addition to the determined data generation attribute) as a basis to select the set of audible news stories, such as in a same or a similar manner as described above in connection with FIG. 2. As such, the server 102 may select a playlist template, and then for each placeholder of the playlist template, the server 102 may select a corresponding set of audible news stories and may replace the placeholder with media attribute data for the selected set of audible news stories, thereby "converting" the playlist template into a playlist.

The server may select 102 a playlist template in a variety of ways, such as based on an attribute associated with the user as described above. In some instances, such as where no attributes associated with the user are available, the server 102 may select a predetermined playlist template.

In some instances, the server 102 may also use the determined attribute associated with the audible version of the news story as a basis to determine an arrangement of the selected set of audible news stories. In this case, the server 102 using the selected set of audible news stories to generate the playlist may involve the server using the selected set of audible news stories to generate the playlist in accordance with the determined arrangement. In some instances, the server 102 may select and/or arrange audible news stories for the entire playlist or for a particular portion thereof (e.g., a portion corresponding to a placeholder in a playlist template).

The server 102 may determine such an arrangement based on other factors as well. For instance, the server 102 may determine the arrangement by using to a predetermined arrangement technique. In one example, an arrangement technique may, when used, minimize the number of audible news stories represented by TTS data separating the audible news stories represented by recorded voice data, to avoid presenting the user with too many consecutive audible news stories generated represented by TTS data as this may diminish the user's experience. In another example, the arrangement technique may specify a threshold value indicating a maximum number of audible news stories represented by TTS data that may separate audible news stories represented by recorded voice data in order to achieve a similar result as the previously described implementation. Other arrangement techniques are also possible, including for example, techniques that employ "simulated annealing" metaheuristics.

The arrangement technique may also be implemented to preferentially place audible news stories represented by recorded voice data towards the beginning, middle, or end of the playlist, as desired (e.g., to help enhance the user experience at certain a certain point in the news program). Other methods of arrangement that include preferential placement may be implemented as well.

Further, at block 506, the method then involves the server 102 transmitting the generated playlist to the client 104, and at block 508, the method involves the client 104 receiving the transmitted playlist. At block 510, the method then involves the client 104 traversing the received playlist, and for each audible news story referenced by the playlist, (i) the client 104 transmitting to the server 102 a request for data representing that referenced audible news story, (ii) the server 102 receiving the transmitted request, (iii) responsive to the server 102 receiving the transmitted request, the server 102 transmitting the requested data to the client 104, (iv) the client 104 receiving the transmitted data, and (v) the client 104 playing for the user the audible news story represented by the received data. The functions at blocks 506, 508, and 510 may be carried out in a same or a similar manner as the functions at blocks 206, 208, and 210, respectively as described above in connection with FIG. 2.

Figure 6:
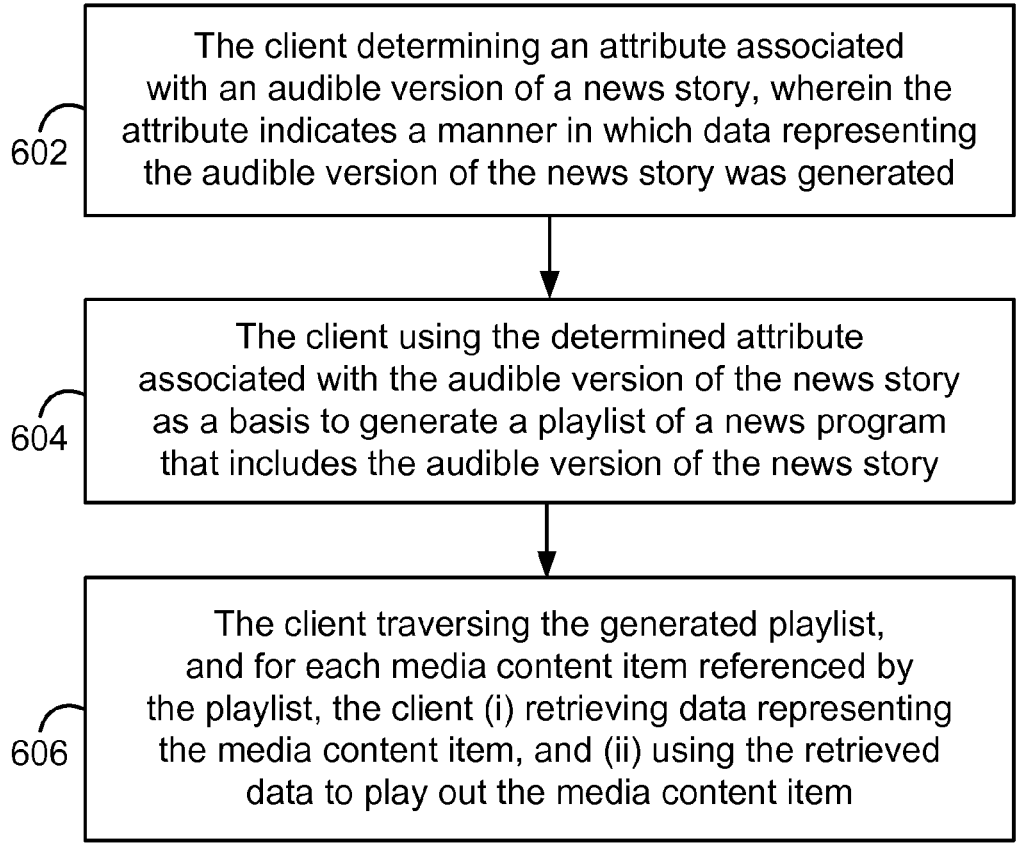
FIG. 6 is a flow chart depicting functions of another example method.

In some instances, another entity such as the client 104 may perform one or more of the functions described above as being performed by the server 102. An example of this is provided in connection with FIG. 6, which is a flow chart depicting functions that can be carried out in another example method for providing a user of the client 104 with a news program.

At block 602, the example method involves the client 104 determining an attribute associated with an audible version of a news story, wherein the attribute indicates a manner in which data representing the audible version of the news story was generated. At block 604, the example method involves the client 104 using the determined attribute associated with the audible version of the news story as a basis to generate a playlist of a news program that includes the audible version of the news story. At block 606, the example method involve the client 104 traversing the generated playlist, and for each media content item referenced by the playlist, the client 104 (*i*) retrieving data representing the media content item, and (ii) using the retrieved data to play out the media content item. In one example, the function at block 606 may involve additional functions performed by the server 102 and/or the client 104 such as those described above in connection with block 210.

V. Example Variations

The variations described in connection with select examples of the disclosed system and method may be applied to all other examples of the disclosed system and method.

Further, while one or more functions have been described as being performed by or otherwise related to certain devices or entities (e.g., the server 102 or the client 104), the functions may be performed by or otherwise related to any device or entity. As such, any function that has been described as being performed by the server 102 could alternatively be performed by a different server or by the client 104. For instance, in one example, a one server could generate and transmit a playlist to a client, and based on the playlist data of the playlist, the client could request and receive different portions of audible content from multiple other servers.

Further, the functions need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method comprising:
   determining an attribute associated with an audible version of a news story, wherein the attribute indicates that a manner in which data representing the audible version of the news story was generated is either (i) by recording a human verbal reading of a text based version of the news story, or (ii) by a text-to-speech system based on data representing the text based version of the news story;
   using the determined attribute associated with the audible version of the news story as a basis to generate a playlist of a news program that includes the audible version of the news story; and
   transmitting the generated playlist to a client device.

2. The method of claim 1, wherein using the determined attribute associated with the audible version of the news story as the basis to generate the playlist of the news program that includes the audible version of the news story comprises:
   using the determined attribute associated with the audible version of the news story as a basis to select a set of audible news stories from a group of audible news stories, wherein the selected set of audible news stories includes the audible version of the news story; and
   using the selected set of audible news stories to generate the playlist, wherein the generated playlist includes references to each audible news story from the selected set of audible news stories.

3. The method of claim 2, further comprising:
   selecting a playlist template of the news program; and
   using the selected template as a basis to select the set of audible news stories from the group of audible news stories.

4. The method of claim 3, further comprising:
   determining an attribute associated with a user of the client device,
   wherein selecting the playlist template of the news program comprises using the determined attribute associated with the user as a basis to select the playlist template of the news program.

5. The method of claim 2, further comprising:
using the determined attribute associated with the audible version of the news story as a basis to determine an arrangement of the selected set of audible news stories, wherein using the selected set of audible news stories to generate the playlist comprises using the selected set of audible news stories to generate the playlist in accordance with the determined arrangement.

6. The method of claim 2, further comprising:
using a predetermined arrangement technique as a basis to determine an arrangement of the selected set of audible news stories, wherein the arrangement technique specifies a threshold value indicating a maximum number of audible news stories generated by the text-to-speech system that may separate audible news stories generated by recorded human verbal readings.

7. The method of claim 2, further comprising:
using a predetermined arrangement technique as a basis to determine an arrangement of the selected set of audible news stories, wherein the arrangement technique employs a simulated annealing metaheuristic.

8. A non-transitory computer-readable medium having stored thereon instructions, that when executed by a processor, cause performance of a set of operations comprising:
determining an attribute associated with an audible version of a news story, wherein the attribute indicates that a manner in which data representing the audible version of the news story was generated is either (i) by recording a human verbal reading of a text based version of the news story, or (ii) by a text-to-speech system based on data representing the text based version of the news story;
using the determined attribute associated with the audible version of the news story as a basis to generate a playlist of a news program that includes the audible version of the news story; and
transmitting the generated playlist to a client device.

9. The non-transitory computer-readable medium of claim 8, wherein using the determined attribute associated with the audible version of the news story as the basis to generate the playlist of the news program that includes the audible version of the news story comprises:
using the determined attribute associated with the audible version of the news story as a basis to select a set of audible news stories from a group of audible news stories, wherein the selected set of audible news stories includes the audible version of the news story; and
using the selected set of audible news stories to generate the playlist, wherein the generated playlist includes references to each audible news story from the selected set of audible news stories.

10. The non-transitory computer-readable medium of claim 9, wherein the set of operations further comprise:
selecting a playlist template of the news program;
using the selected template as a basis to select the set of audible news stories from the group of audible news stories; and
determining an attribute associated with a user of the client device, wherein selecting the playlist template of the news program comprises using the determined attribute associated with the user as a basis to select the playlist template of the news program.

11. The non-transitory computer-readable medium of claim 9, wherein the set of operations further comprise:
using the determined attribute associated with the audible version of the news story as a basis to determine an arrangement of the selected set of audible news stories, wherein using the selected set of audible news stories to generate the playlist comprises using the selected set of audible news stories to generate the playlist in accordance with the determined arrangement.

12. The non-transitory computer-readable medium of claim 9, wherein the set of operations further comprise:
using a predetermined arrangement technique as a basis to determine an arrangement of the selected set of audible news stories, wherein the arrangement technique specifies a threshold value indicating a maximum number of audible news stories generated by the text-to-speech system that may separate audible news stories generated by recorded human verbal readings.

13. A server device comprising:
a communication interface;
a processor; and
a non-transitory computer-readable medium having stored thereon instructions, that when executed by the processor, cause the server device to perform a set of operations comprising:
determining an attribute associated with an audible version of a news story, wherein the attribute indicates that a manner in which data representing the audible version of the news story was generated is either (i) by recording a human verbal reading of a text based version of the news story, or (ii) by a text-to-speech system based on data representing the text based version of the news story;
using the determined attribute associated with the audible version of the news story as a basis to generate a playlist of a news program that includes the audible version of the news story; and
transmitting via the communication interface the generated playlist to a client device.

14. The server device of claim 13, wherein using the determined attribute associated with the audible version of the news story as the basis to generate the playlist of the news program that includes the audible version of the news story comprises:
using the determined attribute associated with the audible version of the news story as a basis to select a set of audible news stories from a group of audible news stories, wherein the selected set of audible news stories includes the audible version of the news story; and
using the selected set of audible news stories to generate the playlist, wherein the generated playlist includes references to each audible news story from the selected set of audible news stories.

15. The server device of claim 14, wherein the set of operations further comprise:
selecting a playlist template of the news program;
using the selected template as a basis to select the set of audible news stories from the group of audible news stories; and
determining an attribute associated with a user of the client device, wherein selecting the playlist template of the news program comprises using the determined attribute associated with the user as a basis to select the playlist template of the news program.

16. The server device of claim 14, wherein the set of operations further comprise:
using the determined attribute associated with the audible version of the news story as a basis to determine an arrangement of the selected set of audible news stories, wherein using the selected set of audible news stories to generate the playlist comprises using the selected set of audible news stories to generate the playlist in accordance with the determined arrangement.

17. The server device of claim 14, wherein the set of operations further comprise:

using a predetermined arrangement technique as a basis to determine an arrangement of the selected set of audible news stories, wherein the arrangement technique specifies a threshold value indicating a maximum number of audible news stories generated by the text-to-speech system that may separate audible news stories generated by recorded human verbal readings.

18. A method comprising:

determining an attribute associated with an audible version of a news story, wherein the attribute indicates that a manner in which data representing the audible version of the news story was generated is either (i) by recording a human verbal reading of a text based version of the news story, or (ii) by a text-to-speech system based on data representing the text based version of the news story;

using the determined attribute associated with the audible version of the news story as a basis to generate a playlist of a news program that includes the audible version of the news story; and traversing the generated playlist, and for each media content item referenced by the playlist, (i) retrieving data representing the media content item, and (ii) using the retrieved data to play out the media.

19. The method of claim 18, wherein using the determined attribute associated with the audible version of the news story as the basis to generate the playlist of the news program that includes the audible version of the news story comprises:

using the determined attribute associated with the audible version of the news story as a basis to select a set of audible news stories from a group of audible news stories, wherein the selected set of audible news stories includes the audible version of the news story; and using the selected set of audible news stories to generate the playlist, wherein the generated playlist includes references to each audible news story from the selected set of audible news stories.

20. The method of claim 19, further comprising:

using the determined attribute associated with the audible version of the news story as a basis to determine an arrangement of the selected set of audible news stories, wherein using the selected set of audible news stories to generate the playlist comprises using the selected set of audible news stories to generate the playlist in accordance with the determined arrangement.

21. The method of claim 19, further comprising:

using a predetermined arrangement technique as a basis to determine an arrangement of the selected set of audible news stories, wherein the arrangement technique specifies a threshold value indicating a maximum number of audible news stories generated by the text-to-speech system that may separate audible news stories generated by recorded human verbal readings.

* * * * *